Patented June 27, 1950

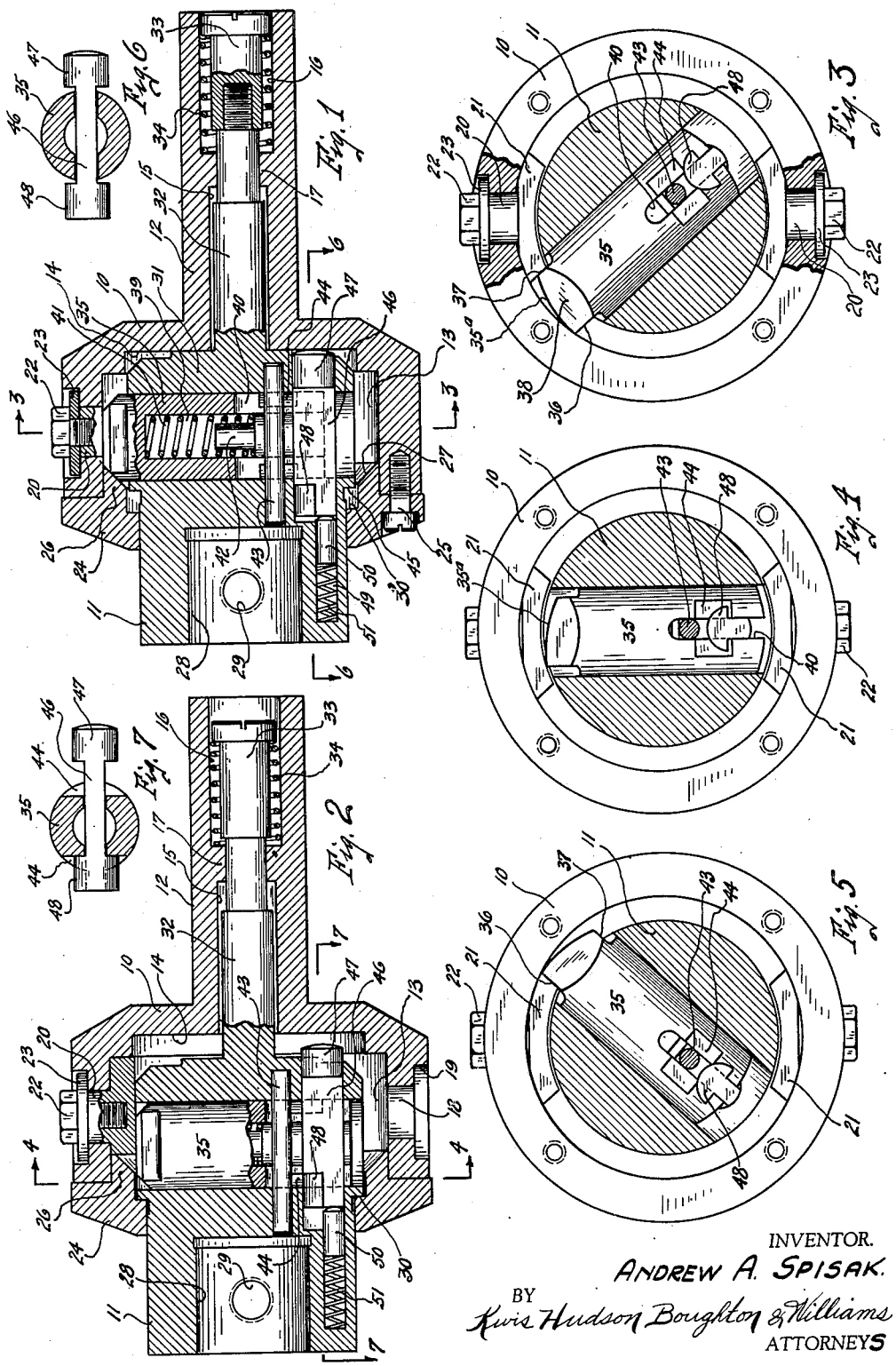

2,512,780

UNITED STATES PATENT OFFICE 2,512,780

CLUTCH TAP AND DIE HOLDER

Andrew A. Spisak, Cleveland, Ohio, assignor to The Warner & Swasey Company, Cleveland, Ohio, a corporation of Ohio Application April 9, 1945, Serial No. 587,408

15 Claims. (Cl. 10—89)

This invention relates to a novel and improved clutch tap and die holder.

An object of the invention is to provide an improved and novel clutch tap and die holder which is efficient and accurate in operation, is simple in construction and is so designed as to provide minimum wear of the various parts and consequently long life for the tap and die holder.

A further object is to provide an improved and novel clutch tap and die holder which is so constructed as to eliminate damaging contact between the relatively movable parts, and particularly the knife edges thereof, when the main units of the holder are in unclutched relationship.

A still further object is to provide an improved and novel clutch tap and die holder such as specified in the last named object and wherein when the main units of the holder are in unclutched relationship the knife edges of the movable parts are positively held separated and out of contact with each other.

A further object is to provide an improved and novel clutch tap and die holder as referred to in the last named object and wherein the positive means for maintaining the knife edges of the movable parts separated when the main units of the holder are in unclutched relationship is automatically released when the threading tool carrried by the holder backs off from the work.

Another object is to provide an improved and novel clutch tap and die holder which is so designed as to be readily adapted for use with taps or dies for cutting either right or left hand threads.

Further and additional objects and advantages not hereinbefore specified will become apparent during the detailed description of an embodiment of the invention and which description is to follow.

Referring to the accompanying drawing,

Fig. 1 is a longitudinal sectional view through a clutch tap and die holder embodying the invention.

Fig. 2 is a view similar to Fig. 1, but illustrating the parts of the clutch tap and die holder in different relationship and taken on a slightly different section line than Fig. 1.

Fig. 3 is a transverse section taken substantially on line 3—3 of Fig. 1 looking in the direction of the arrows with certain of the parts in elevation.

Fig. 4 is a transverse sectional view taken on line 4—4 of Fig. 2 looking in the direction of the arrows with the cap removed and with certain of the parts shown in elevation.

Fig. 5 is a view similar to Fig. 3 but showing the relationship of the parts when the relative rotation of the main units of the holder is in the reverse direction as is the case in Fig. 3.

Figs. 6 and 7 are detached sectional views taken substantially on lines 6—6 and 7—7 of Figs. 1 and 2, respectively, looking in the direction of the arrows, certain of the parts being in elevation.

The clutch tap and die holder embodying the present invention and illustrated in the drawing comprises two main units, namely, the body unit 10 and the tap or die carrying unit 11. The body 10 is substantially cylindrical in shape and is provided in this instance with an attaching shank 12 disposed concentrically to the body and which shank is adapted to extend into the opening in the face of a turret or similar tool carrying member of a machine tool and be clamped therein as is readily understood in the art. The body 10 is provided with a cylindrical chamber 13 including an outer counterbored portion. The end wall 14 of the chamber adjacent to the shank 12 is perpendicular to the axis of the shank. The shank 12 is provided with a small bore portion 15 and a larger bore portion 16 separated by a reduced bearing portion 17. The body 10 is provided at diametrically opposite sides with aligned openings 18 which communicate at their inner ends with the chamber 13 and at their outer ends with counterbores 19 (see Fig. 2).

The shank 20 of a segmental stop or abutment shoe 21 is located in one of the openings 18. The stop or abutment shoe 21 is provided on its opposite ends with inclined surfaces convergently disposed with respect to each other and each parallel to a different radial line of the unit 10 (see Fig. 3). The lower corners of the abutment shoe 21 constitute knife edges which will later be referred to. The stop shoe 21 is located within the chamber 13 and its inner side contacts the shoulder formed by the counterbored portion of the chamber, see Figs. 2 and 3. The stop or abutment shoe 21 is clamped in positioni by means of a headed clamping screw 22 extending into a threaded bore in the shank 20 and having its head engaging a washer 23 located in the counterbore 19.

A second stop or abutment shoe 21 and attaching shank 20 may be clamped in the other opening 18 if desired, as illustrated in Fig. 3, and for a purpose which will later be pointed out. Of course the stop or abutment shoe or shoes 21 could be formed integral with the main unit 10, if desired, but for purposes of manufacture and assembly it is preferred to make these shoes separate from the main unit 10 and rigidly clamp the same in operative position therein. Also the fact that the shoes are removable enables the same to be replaced should they become worn or damaged.

The unit 11, which will be later described, is mounted in the unit 10 and held in assembled position with the unit 10 in part by means of a cap member 24 secured to the open end of the unit 10 by suitable securing means such as the screws 25 (see Fig. 1) which pass through the annular flange of the cap member 24 that overlies the end of the unit 10. The cap member 24 is provided with a sleeve-like portion 26 which interfits the left hand end of the chamber 12, as viewed in the drawings, and said sleeve-like portion has a conical inner end 27 which acts as a camming surface in a manner later to be explained.

The tap or die carrying unit 11 comprises a portion extending outwardly through the central opening in the cap member 24 and provided with a tool socket 28 and in which socket the tool, such as the tap or die, can be secured by means of clamping screws or other suitable well known means mounted in the threaded opening 29. The wall of the central opening in the cap member 24 constitutes a bearing support for the unit 11 and said wall as clearly shown in Figs. 1 and 2, has an annular shoulder portion 30 for a purpose which will later become apparent. The unit 11 inwardly of the cap member 24 has a portion 31 in which is mounted a sliding clutch member later to be referred to (see Fig. 1). The right hand end of the portion 31 of the unit 11, as viewed in the drawing, is perpendicular to the axis of the unit and in one position of the parts abuts the end wall 14 of the chamber 13, see Fig. 1. The unit 11 is also provided with a shaft portion 32 which extends centrally from the portion 31 into the bores 15 and 16 and the bearing portion 17 of the shank 12, as clearly indicated in Figs. 1 and 2. The shaft portion 32 at its free end is provided with a reduced threaded part on which a retaining screw 33 is mounted. A coil spring 34 is arranged in the larger bore 16 of the shank 12 and surrounds the shaft 32 and the retaining screw 33 abutting the head of said screw at its outer end.

It will be seen that the spring 34 acts normally to urge the shaft 32 toward the right and to maintain engagement between the end wall 14 of the cylindrical chamber 13 of the unit 10 and the end wall of the portion 31 of the unit 11 in engagement with each other as shown in Fig. 1.

The portion 31 is provided with a diametrically extending opening therethrough in which slides a clutch member 35. This clutch member has its end adjacent to the shoe 21 provided on opposite sides with cutaway portions 36 and 37 and said portions form contact surfaces for cooperation with the inclined contact surfaces on the opposite ends of the stop shoe 21 (see Fig. 3). The said end of the clutch member 35 at right angles to the cutaway portions 36 and 37 has beveled surfaces 38 on each side of the member and one or the other of said beveled surfaces cooperates with the conical inner end 27 of the cap member 24 for a purpose later to be explained and depending upon the hand of the threads being cut. The extreme outer end of the clutch member 35 is curved to provide a camming surface 35a, so shaped that the cutaway portion 36 is longer than the cutaway portion 37 as clearly indicated in the drawings and for a purpose later to be explained.

The clutch member 35 is provided with a bore 39 extending from the opposite end of the member longitudinally thereof and said opposite end of the member is provided with a longitudinally extending slot 40 extending transversely through the member. A coil spring 41 is mounted in the bore 39 and abuts one end of the bore and also a washer pin 42 which in turn abuts a pin 43 carried by the portion 31 and extending freely through the slot 40 of the member 35 and holding said member against turning movement relative to the portion 31, while the spring normally urges said clutch member radially outwardly. The clutch member 35 on diametrically opposite sides and at right angles to the slot 40 is provided with milled notches 44 for a purpose later to be explained.

The portion 31 of the unit 11 within the sleeve-like portion 26 of the cap 24 is formed with an annular shoulder 45 that abuts the shoulder 30 in the cap member to limit relative endwise movement between the units 10 and 11 toward the left. The portion 31 of the unit 11 is provided with a longitudinally extending bore parallel to but displaced from the axis of the unit but extending transversely of the opening through the portion in which the clutch member 35 is slidably mounted. Slidably mounted in said bore in the portion 31 is a locking member 46 provided at one end with a round head 47 and at its opposite end with a semi-cylindrical locking portion 48. The locking member 46, as already stated, is slidable in the bore in the portion 31 and extends freely through the slot 40 in the clutch member 35. The unit 11 is also provided with a cylindrical longitudinally extending recess 49 communicating with the bore in which the locking member slides but offset outwardly with respect to the axis of the bore. A plunger 50 is slidable in the recess 49 and is maintained in engagement with the end of the locking member 46 by a spring 51 located in the recess, as clearly shown in Figs. 1 and 2.

It will thus be seen that the plunger 50 normally urges the locking member 46 toward the right as viewed in the drawings and when the units 10 and 11 are in the relative position shown in Fig. 1 the cylindrical end 47 of the locking member abuts the straight end wall 14 of the cylindrical chamber 13.

When the parts are in the position shown in Fig. 1 it will be noted by reference to Fig. 6 that the ends 47 and 48 of the locking member are located outwardly of the circumference of the clutch member 35, while when the parts are in the relation shown in Fig. 2 the semi-cylindrical end 48 of the locking member is located in the left hand notch 44 of the clutch member 35, as indicated in Fig. 7.

The normal or interclutched relationship of the body unit 10 and the tap or die carrying unit 11 and the parts associated therewith is indicated in Figs. 1, 3 and 6. It being assumed that the shank 12 is secured in the tool holding member of the slide of a machine tool and that a tap or die is mounted in the socket 28 of the unit 11, the operator will cause the slide to move to bring the tap or die into engagement with the work and will continue such movement of the slide while the tap or die is cutting threads in or on the work. During the referred to movement of the slide the inner end of the portion 31 of the unit 11 is in contact with the end wall 14 of the chamber 13 of the body unit 10 and the contact surface provided by the cutaway portion 37 of the clutch member 35 is in engagement with the left hand inclined end of the stop shoe 21, as indicated in Fig. 3. At this time and during the threading operation the units 10 and 11 of the holder have no relative rotative movement as they are interconnected or clutched together by the engagement of the surface 37 with the inclined left hand end of the stop shoe 21.

Near the end of the threading operation the movement of the slide is terminated by the operator, but due to the engagement of the tap or die with the rotating work piece the unit 11 has endwise movement imparted thereto toward the left and relative to the unit 10. This endwise movement results in the sliding clutch member 35 being cammed radially inwardly by the conical portion 27 of the cap member 24 and against the action of the spring 41. As the unit 11 moves toward the left relative to the unit 10, as just referred to, the plunger 50 urges the locking member 46 toward the right as soon as the cylindrical head 47 of said member moves away from the wall 14. However, the semi-cylindrical end 48 of the rocking member contacts the circumference of the sliding clutch member 35 and is held in such position by the plunger 50, with the result that the locking member 46 moves toward the left with the portion 31. However, as soon as the clutch member 35 has been cammed sufficiently far inwardly to disengage the cutaway surface 37 from the inclined end of the stop or abutment shoe 21, the unit 11 is free to rotate with the work and relative to the unit 10.

As the unit 11 rotates relative to the unit 10 in a clockwise direction and during forward rotation of the work piece the curved end 35a of the clutch member 35 engages the inner curved end surface of the stop shoe 21, as shown in Fig. 4, and moves across said inner surface, with the result that the clutch member 35 is depressed slightly farther, due to the camming action of the surface 35a of the clutch member, and this further depression of the clutch member brings the notch 44 in the clutch member in registry with the semi-cylindrical end 48 of the locking member 46, whereupon the spring plunger 50 immediately forces said end 48 of the locking member into the notch as indicated in Figs. 2 and 4 and the clutch member 35 is thus positively held and locked in withdrawn position.

During any additional relative rotation between the units 11 and 10 the knife edge at the junction of the surfaces 37 and 35a of the clutch member will not contact the lower left hand knife edge of the abutment shoe 21 and therefore said knife edges will not be damaged. During this continued relative rotation between the units the high point of the curved surface 35a of the clutch member will contact and ride lightly over the curved inner surface of the stop or abutment shoe 21 and the contact of the high point with the abutment stop will cause slight radial inward movement of the clutch member 35 during each clockwise rotation of the unit 11.

The relative endwise movement between the units 10 and 11 and toward the left, as just above referred to, compresses the spring 34 and continues until the units 10 and 11 are disconnected and the unit 11 rotates relative to the unit 10 and this occurs just prior to the annular shoulder 45 of the unit 11 engaging with the annular shoulder 30 of the cap member 24.

When the operator reverses the rotation of the work piece to back off the tap or die the unit 11 will turn with the work piece in the reverse or anti-clockwise direction, since it is threadedly connected therewith through the tap or die. This reverse rotation of the unit 11 continues until the longer contact surface 36 of the clutch member 35 engages the right hand inclined end as viewed in the drawing of the stop shoe 21 (see Fig. 5) it being recalled that the high point of surface 35a is located slightly outwardly of the inner circumference of the abutment shoe 21, whereupon the units 11 and 10 are interclutched and held against relative rotation. The result is that the rotation of the unit 11 is now terminated and therefore the tap or die carried by said unit backs off from the work and moves the unit 11 endwise toward the right relative to the unit 10.

During this endwise movement of the unit 11 the cylindrical end 47 of the locking member 46 engages the straight end wall 14 of the cylindrical chamber 13 and during the continued endwise movement of the unit 11 the locking member 46 remains stationary, with the result that the semi-cylindrical end 48 of the locking member is disengaged from the notch 44 and the clutching member 35 is freed and is restored by the spring 41 to its outward operative position, as viewed in Fig. 5, and wherein the highest point of the surface 35a contacts the peripheral wall of the cylindrical chamber 13.

Assuming that the tap or die is still engaged with the work the operator moves the slide rearwardly until the tap and die is completely disengaged from the work, whereupon the spring 34 restores the parts to their original relationship if they have not previously been so positioned. Should the operator move the slide rearwardly immediately upon reversing the rotation of the spindle and work no relative endwise movement between the units 11 and 10 will occur until the tap or die is free from the work, it being understood that the instant the rotation of the spindle and work is reversed the longest surface 36 of the clutch member 35 engages the right hand end of the stop shoe 21 and there is no relative rotation between the units 10 and 11. In other words, when the slide is not instantly moved rearwardly by the operator upon reversing the direction of rotation of the spindle and work it is the backing off movement of the tap or die which imparts relative endwise movement to the unit 11 and causes the clutch member to be unlocked and restored to operative position as previously explained, but when the operator immediately moves the slide rearwardly upon the reversal of the rotation of the spindle and work it is the spring 34 that imparts the endwise movement to the unit 11 as soon as the tap or die is free from the work.

The description heretofore given has been in connection with the parts arranged for right hand threading operations. In the event that the clutch tap and die holder is to be used for left hand threading operations the operator merely removes the cap 24, unscrews the screw 33, partially withdraws the unit 11 from the unit 10, then withdraws the clutch member 35 to disengage the slot 40 from the pin 43, rotates said clutch member 180°, reinserts said clutch member, again reassembles the unit 11 in the unit 10 and replaces and screws the cap 24 in position. In other words, the rotation of the clutch member 35 through 180° places the long surface 36 of the clutch member in the relative position of the short surface 37 and vice versa. Consequently the shorter surface 37 of the clutch member 35 will engage the right hand side of the stop shoe 21 as viewed in the drawing to interclutch the units 10 and 11, while the longer surface 36 will engage the left hand side of the stop shoe 21 during the backing off of the tap or die with respect to the work.

If desired, a second stop shoe 21 can be positioned and clamped in the second opening 18 and this results in a very quick acting device, inasmuch as the units need only a partial rotation to bring the surfaces at the end of the clutch member into contact with one or the other of the stop shoes 21, whereas when only a single stop shoe is employed the units must have relative rotation through nearly a complete revolution. Although only one shoe functions at a time the use of two stop shoes in place of only one stop shoe distributes any wear which may occur on the shoe surfaces from their engagement with the clutch member and hence will prolong the life of the clutch tap and die holder.

Although a preferred embodiment of the invention has been illustrated and described herein, it will be understood that the invention is susceptible of various modifications and adaptations within the scope of the appended claims.

Having thus described my invention, I claim:

1. A tap and die holder comprising a pair of relatively rotatable and endwise movable units, said units having cooperating clutching means normally interconnecting said units against relative rotation and including a movable member carried by one of said units, the other of said units and said member having cooperating portions acting upon a relative endwise movement between said units to move said member and disengage said clutching means to free said units for relative rotation, and locking means for said member operatively associated with said member and functioning automatically upon disengagement of the clutching means under the action of said cooperating portions to positively lock the member in disengaged position with the normally contacting surfaces of said clutching means out of contact, whereby wear on said surfaces during said relative rotation of the units is eliminated.

2. A tap and die holder comprising a pair of relatively rotatable and endwise movable units, said units having cooperating clutching means normally interconnecting said units against relative rotation and including a movable member carried by one of said units, the other of said units and said member having cooperating portions acting upon relative endwise movement in one direction between said units to move said member and disengage said clutching means to free said units for relative rotation, and locking means for said member operatively associated with said member and functioning automatically upon disengagement of the clutching means under the action of said cooperating portions to positively lock the member in disengaged position with the normally contacting surfaces of said clutching means out of contact, whereby wear on said surfaces during said relative rotation of the units is eliminated, said locking means including an element carried by said one unit and cooperating with a portion of said member.

3. A tap and die holder comprising a pair of relatively rotatable and endwise movable units, said units having cooperating clutching means normally interconnecting said units against relative rotation and including a slidable member carried by one of said units, the other of said units and said member having cooperating portions acting upon relative endwise movement in one direction between said units to move said member and disengage said clutching means to free said units for relative rotation, and locking means for said member operatively associated with said member and functioning automatically upon disengagement of the clutching means under the action of said cooperating portions to positively lock the member in disengaged position with the normally contacting surfaces of said clutching means out of contact, whereby wear on said surfaces during said relative rotation of the units is eliminated, said means including an element carried by said one unit and cooperating with a portion of said member.

4. A tap and die holder comprising a pair of relatively rotatable and endwise movable units, one of said units having a movable clutch member and the other of said units having an abutment shoe with which said clutch member normally cooperates to interconnect said units against relative rotation, said other unit and said member having cooperating portions acting upon relative endwise movement in one direction between said units to disengage said member from said shoe to free said uniits for relative rotation, and locking means for said member operatively associated with said member and functioning automatically upon disengagement of the latter under the action of said cooperating portions to positively lock the same in disengaged position with the normally contacting surfaces of said shoe and member out of contact, whereby wear on said surfaces during said relative rotation of the units is eliminated.

5. A tap and die holder comprising a pair of relatively rotatable and endwise movable units, one of said units having a movable clutch member and the other of said units having an abutment shoe with which said member normally cooperates to interconnect said units against relative rotation, said other unit and said member having cooperating portions acting upon relative endwise movement in one direction between said units to disengage said member from said shoe to free said units for relative rotation, and locking means for said member operatively associated with said member and functioning automatically upon disengagement of the latter under the action of said cooperating portions to positively lock the member in disengaged position with the normally contacting surfaces of said shoe and member out of contact, whereby wear on said surfaces during said relative rotation of the units is eliminated, said means including an element carried by said one unit and cooperating with a portion of said member.

6. A tap and die holder comprising a pair of relatively rotatable and endwise movable units, one of said units having a slidable clutch member and the other of said units having an abutment shoe with which said member normally cooperates to interconnect said units against relative rotation, said other unit and said member having cooperating portions acting upon relative endwise movement in one direction between said units to disengage said member from said shoe to free said units for relative rotation, and locking means for said member operatively associated with said member and functioning automatically upon disengagement of the latter under the action of said cooperating portions to positively lock the same in disengaged position with the normally contacting surfaces of said shoe and member out of contact, whereby wear on said surfaces during said relative rotation of the units is eliminated, said means including an element carried by said one unit and cooperating with a portion of said member.

7. A tap and die holder comprising a pair of relatively rotatable and endwise movable units, said units having cooperating clutch means normally interconnecting said units against relative rotation and including a movable member carried by one of said units, the other of said units and said member having cooperating portions acting upon relative endwise movement in one direction between said units to move said member and disengage said clutching means to free said units for relative rotation, and means operatively associated with said member and functioning automatically upon disengagement of the clutching means to positively lock the member in disengaged position with the normally contacting surfaces of said clutching means out of contact, said latter means including a portion engageable with the other of said units upon relative movement between the units in the opposite direction to automatically release said means.

8. A tap and die holder comprising a pair of relatively rotatable and endwise movable units, said units having cooperating clutching means normally interconnecting said units against relative rotation and including a slidable member carried by one of said units, the other of said units and said member having cooperating portions acting upon relative endwise movement in one direction between said units to move said member and disengage said clutching means to free said units for relative rotation, and means operatively associated with said member and functioning automatically upon disengagement of the clutching means to positively lock the member in disengaged position with the normally contacting surfaces of said clutching means out of contact, said latter means including an element carried by said one unit and cooperating with a portion of said member, said element having means operatively associated therewith and engageable with the other of said units upon relative endwise movement between the units in the opposite direction to automatically release said locking means.

9. A tap and die holder comprising a pair of relatively rotatable and endwise movable units, one of said units having a movable clutch member and the other of said units having an abutment shoe with which said member normally cooperates to interconnect said units against relative rotation, said other unit and said member having cooperating portions acting upon relative endwise movement in one direction between said units to disengage said member from said shoe to free said units for relative rotation, and means operatively associated with said member and functioning automatically upon disengagement of the latter to positively lock the same in disengaged position with the normally contacting surfaces of said shoe and member out of contact, said means including a portion engageable with said other unit upon relative endwise movement between said units in the opposite direction to automatically release said locking means.

10. A tap and die holder comprising a pair of relatively rotatable and endwise movable units, one of said units having a slidable clutch member and the other of said units having an abutment shoe with which said member normally cooperates to interconnect said units against relative rotation, said other unit and said member having cooperating portions acting upon relative endwise movement in one direction between said units to disengage said member from said shoe to free said units for relative rotation, and means operatively associated with said member and functioning automatically upon disengagement of the latter to positively lock the same in disengaged position with the normally contacting surfaces of said shoe and member out of contact, said means including an element carried by said one unit and cooperating with a portion of said member and having means operatively associated therewith and engageable with said other unit upon relative endwise movement between the units in the opposite direction to automatically release said locking means.

11. A tap and die holder comprising a pair of relatively rotatable and endwise movable units, the said units having cooperating clutching means normally interconnecting said units against relative rotation and including a movable member carried by one of said units and an abutment carried by the other of said units, the other of said units and said member having cooperating portions acting upon relative endwise movement in one direction between said units to move said member and disengage said clutching means to free said units for relative rotation and including a camming surface on the other of said units and a camming surface on said member, and locking means for said member operatively associated with said member and functioning automatically upon disengagement of the clutching means under the action of said cooperating portions to positively lock the member in disengaged position.

12. A tap and die holder comprising a pair of relatively rotatable and endwise movable units, one of said units having a movable clutch member and the other of said units having an abutment with which said member normally cooperates to interconnect said units against relative rotation, said other unit and said member having cooperating camming surfaces acting upon relative endwise movement in one direction between said units to move said member to free said units for relative rotation, said abutment and said member having cooperating camming surfaces functioning upon relative rotation between the units to further move said member in a disengaging direction, and locking means for said member operatively associated with said member and functioning automatically upon the last mentioned movement of the latter under the action of said second named cooperating camming surfaces to positively lock the same in its finally moved position.

13. A tap and die holder comprising a pair of relatively rotatable and endwise movable units, one of said units having a movable clutch member and the other of said units having an abutment with which said member normally cooperates to interconnect said units against relative rotation, said other unit and said member having cooperating camming surfaces acting upon relative endwise movement in one direction between said units to move said member to free said units for relative rotation, said abutment and said member having cooperating camming surfaces functioning upon relative rotation between the units to further move said member in a disengaging direction, and means operatively associated with said member and functioning automatically upon the last mentioned movement of the latter to positively lock the same in its finally moved position, said last means including a portion engageable with said other unit during relative endwise movement between the units in the opposite direction to release said locking means.

14. A tap and die holder comprising a pair of relatively rotatable and endwise movable units, said units having cooperating clutching means normally interconnecting said units against relative rotation and including a movable member carried by one of said units, the other of said units and said member having cooperating portions acting upon relative endwise movement in one direction between said units to move said member and disengage said clutching means to free said units for relative rotation, and means operatively associated with said member and functioning automatically upon disengagement of the clutching means to positively lock the member in disengaged position, said latter means including an element carried by said one unit and movable therein and having a portion adapted to cooperate with a portion of said member, and a second element normally urging said first element in locking direction, said first element having a portion normally engaging the other of said units to resist the action of said second element.

15. A tap and die holder comprising a pair of relatively rotatable and endwise movable units, one of said units having a portion provided with a spring pressed movable clutch member, the other of said units being provided with a chamber having a clutching portion located therein and also having therein a camming surface, the said portion of said one unit being located in said chamber and provided with a spring pressed movable clutching member normally contacting the said clutching portion of said other unit to interconnect said units against relative rotation, said clutching member having a camming surface cooperating with the camming surface in the chamber of said other unit and upon relative endwise movement between said units in one direction to move said clutching member in a disengaging direction with respect to said clutching portion, a movable locking element carried by the said portion of said one unit and having a locking portion engageable with a locking portion of said clutching member, spring pressed means carried by said one unit and acting automatically to interengage said locking portions when the latter are brought into registry with each other, said locking element having a portion engageable with said other unit during relative endwise movement between the units in the opposite direction to positively move said element against the action of said spring pressed means and release said locking portions to allow said clutching member to move under spring pressure to its normally clutching position.

ANDREW A. SPISAK.

REFERENCES CITED

The following references are of record in the file of this patent:

UNITED STATES PATENTS

| Number | Name | Date |
| --- | --- | --- |
| 1,346,295 | Burger et al. | July 13, 1920 |
| 1,740,887 | Crosby | Dec. 24, 1929 |
| 2,333,868 | Kylin | Nov. 9, 1943 |
| 2,363,379 | Allen | Nov. 21, 1944 |